Patented Feb. 22, 1944

2,342,483

UNITED STATES PATENT OFFICE 2,342,483

TITANIUM OXIDE PIGMENT PRODUCTION

Carl Marcus Olson, Wilmington, Del., assignor to E. I. du Pont de Nemours & Company, Wilmington, Del., a corporation of Delaware No Drawing. Application July 3, 1942,
Serial No. 449,668

16 Claims. (Cl. 23—202)

This invention relates to the production of improved titanium oxide pigments, and more particularly to the preparation of high quality rutile pigments from hydrolyzable acid solutions of titanium through use of a novel type of hydrolysis nucleating agent or complex.

More specifically, the invention relates to the preparation of a novel seeding or nuclei complex and its subsequent use in titanium salt, especially titanium sulfate, solution hydrolysis, to obtain from such solutions an anatase type of hydrolysate adapted to readily convert to rutile upon being calcined at relatively low, pigment-developing temperatures.

Titanium oxide occurs in three crystalline forms, namely, anatase, brookite and rutile. Of these, anatase and rutile comprise the forms which are most useful for pigment purposes. The third, brookite, remains of interest solely as a product of nature. Anatase has a refractive index of 2.52 while that of rutile is 2.71. The higher potential hiding power of the latter emphasizes its greater desirability as a pigment. Present-day commercial $TiO_2$ pigments, however, are usually in the lower, anatase, modification, for the reason, principally, that more economical methods are available for obtaining that modification from acidic titanium sulfate solutions derived from the sulfuric attack of titaniferous ores, such as ilmenite. Titanium oxide in the form of rutile cannot be precipitated through hydrolysis from titanium sulfate solutions, but may result from the hydrolysis of titanium chloride solutions if very careful controls are exercised. The manufacture of rutile in this manner, however, is not presently considered adaptable for wide commercial exploitation in view of the high costs and the technical difficulties which are encountered therein, especially in the chlorination of titaniferous materials.

When washed or purified, hydrous titanium oxide, such as results from titanium sulfate solution hydrolysis, is calcined in the temperature range of from about 950° C.–1000° C., pigment anatase of good color and hiding power is obtained. If the calcination is conducted at higher temperatures, say, from about 1025° C.–1050° C., or above, the anatase will convert to rutile. The resulting product, however, does not possess the potential higher hiding power and tinting strength of the higher rutile modification, because, necessarily, its particle size and other essential pigment properties are sacrificed as a result of the excessive temperatures required in such conversion. For example, these excessive temperatures induce objectionable sintering, grit and aggregate formation, which with the accompanying undesired growth in pigment particle size is all reflected in the poor color, brightness, texture, tinting strength and hiding power of the final product. Consequently, the properties of said product are often poorer than the anatase from which it is derived. Too coarse to afford maximum hiding power and lacking essential color and other requisite pigment properties, the product is wholly unfit for many intended uses, especially in coating compositions, such as paints, enamels and lacquers wherein the $TiO_2$ pigmenting substance must exhibit these properties. Accordingly, though it has long been known that anatase may be converted to rutile by high temperature calcination processes, the highly unsatisfactory nature of the products derived therefrom has prohibited their use in the manufacture of commercial rutile pigments.

Optimum hiding power, tinting strength, texture and other essential values for a calcined, finished $TiO_2$ pigment are largely dependent upon relative uniformity and average particle size. In turn, uniformity and size vary with and are dependent upon the size of the raw pigment from whence the product is derived, as well as upon the calcination to which said raw pigment is subjected during development. Since optimum particle size for developing hiding power in the higher rutile modification is smaller than the optimum for anatase, there exists the added problem of obtaining an anatase hydrolysate which, upon conversion to rutile, possesses a particle size commensurate with the optimum for that modification. Prior methods have failed to provide such a product or one which inherently possesses such optimum qualities. A real need has thus existed for a process from which such a rutile product can be readily and commercially obtained and which enables one to convert anatase to commercially acceptable rutile without recourse to the undesired high calcination temperatures heretofore required in such conversions.

It is among the primary objects of this invention to overcome the disadvantages attending prior rutile titanium oxide pigment manufacture, and especially those present in previous anatase to rutile conversion processes. A particular object is to provide novel, commercially adaptable methods for attaining these advantageous results, as well as highly useful methods for manufacturing an improved form of pigment rutile which inherently possesses excellent durability and weather-resistance characteristics, together with optimum values in respect to pigment uniformity, average particle size, hiding power, tinting strength, texture, color, brightness, etc. Further objects include: the provision of a novel method for manufacturing such improved type of rutile pigment and by converting precipitated raw anatase pigment at relatively low calcination temperatures, e. g., well below those heretofore employed, whereby the disadvantages which have characterized such prior calcination conversion methods become entirely obviated. Other objects and advantages of the invention will be apparent from the following description thereof.

These and other objects are attainable in this invention which embodies the discovery that if a titanium salt solution, especially titanium sulfate, is hydrolyzed in the presence of a novel form of seeding agent or nucleating complex of this invention, an anatase precipitate from said hydrolysis, quite unexpectedly, will readily convert to rutile when calcined at relatively low temperatures (below substantially 1000° C.) to provide a high quality, commercial rutile pigment.

Commercial anatase pigment manufacture is normally obtained by hydrolyzing a nucleated titanium sulfate solution, said solution having been previously obtained by well-known methods which involve the interaction of sulfuric acid and a titaniferous ore, such as ilmenite, followed by conventional dissolving and clarification processing. These solutions usually contain from about 100 to about 250 g. $TiO_2$ per liter, some ferrous sulfate, and about 1.7 mols $H_2SO_4$ per mol $TiO_2$ in solution with a varying ratio of acid to titanium ranging within from about 1.4 to 2.0 mols of acid over and above that required for the neutralization of the dissolved iron, per mol of dissolved titanium. The seeding of these solutions is effected by relatively simple nucleating procedures and agents, examples of highly useful processes for this purpose including those disclosed in U. S. Reissue Patents 18,854 and 18,790. Thus, in accordance with said Reissue Patent 18,854, the hydrolyzable titanium sulfate solution is conveniently seeded with a small amount of a yield-inducing type of nuclei by striking or adding a portion of the titanium sulfate solution to a smaller volume of a diluent or solution of lesser concentration, such as relatively pure water, and while said diluent is maintained throughout the mixing operation at an elevated temperature. The less concentrated solution is thereupon nucleated, the seed content thereof being eminently suited for accelerating the hydrolysis of the titanium sulfate solution to obtain a high yield of precipitated raw pigment anatase, upon heating or boiling said solution in the presence of said seed. This yield-inducing type of seed, when subjected to X-ray analysis, will be found to comprise substantially anatase and remains in that modification even after heat treatment at temperatures ranging from about 400° C. to about 600° C.

I have now discovered that if in lieu of conducting titanium solution hydrolysis in the presence of the normal yield-inducing type of nuclei, said hydrolysis is conducted in the presence of a complex form of nucleating agent, comprising both yield-inducing and rutile-inducing nuclei components, the raw pigment precipitate which is subsequently recovered will be of such modified character that the calcination thereof at relatively low temperatures (below substantially 1000° C. and preferably from about 850° C.–975° C.) will provide a high quality, commercial rutile pigment. The rutile-inducing constituent of said complex may comprise rutile at ordinary temperatures, depending upon the conditions prevailing during its manufacture, or may comprise rutile after calcination at a temperature of 600° C. or less, but preferably at from about 400° C. to 600° C.

In one practical and preferred adaptation of the invention, a relatively concentrated, hydrolyzable titanium sulfate solution is first seeded in accordance with said U. S. Reissue Patent 18,854, with a relatively small amount, say, from about .3% to 2%, of the total $TiO_2$ to be hydrolyzed of the yield-inducing colloidal $TiO_2$ nuclei, by adding the titanium solution to a smaller volume of hot water maintained at a temperature of about 90° C. to the boil. Immediately after formation of the yield-inducing component of the ultimate complex, a relatively small amount, say, from about .1% to 2% (also based on the $TiO_2$ to be hydrolyzed) of the rutile-inducing component of the complex, is added to the mixture. One preferred form of the latter type of agent comprises the more or less dilute titanium oxide suspension which is obtained on heat treating precipitated, sulfate ion-free, orthotitanic acid in the presence of an activating or conditioning agent which is substantially peptizing in character. Suitable nuclei of this type comprises that disclosed in the copending U. S. patent application of John L. Keats et al., Ser. No. 283,052, filed July 6, 1939. After suitable incorporation of the desired amount of nucleating complex in the titanium sulfate solution, the mixture is then hydrolyzed in accordance with conventional procedures, as by heating to an elevated temperature, ranging from about 80° C. to the boiling point, and continuing the hydrolysis until in excess of substantially 95% $TiO_2$ precipitation takes place. The resulting anatase hydrolysate, after conventional washing and purification treatments, is then calcined at temperatures ranging from about 850° C. to 975° C., which comprise those normally used in commercial anatase pigment manufacture. Preferably, the calcination of said hydrolysate is conducted in the presence of a small amount of an alkali metal salt, such as sodium and potassium sulfate, and in accordance with U. S. Patent 1,892,693. The calcined pigment product, after the usual finishing treatments, such as wet or dry grinding processing, comprises high quality rutile exhibiting optimum values in respect to hiding power, tinting strength, texture, color, particle size, etc., and is eminently suited for use in all types of commercial pigment usages, especially as the pigmenting substance in coating compositions, such as paints, enamels, lacquers, etc.

To a more complete understanding of the invention, the following specific examples are given, which are to be construed as merely in illustration but not in limitation of the invention:

*Example I*

4 liters of a relatively concentrated titanium sulfate solution containing 250 g. of $TiO_2$ per liter, 80 g. per liter of iron, 660 g./l. of $H_2SO_4$ and 3 g./l. of $Ti_3^{+++}$, were heated to 97° C. in a reaction vessel. Simultaneously, one liter of water was heated to 91° C. in a separate vessel having sufficient capacity to hold the entire volume of both liquors. The titanium sulfate solution was then added to the water at a rate of 250 cc. per minute. The temperature of the resulting mixture was raised at the rate of ⅓ of a degree per minute to the boiling point of the solution. Fifty minutes after the start of the liquor addition, the titanium solution had turned from a dark black color to a gray green color, indicating that a large number of colloidal $TiO_2$ yield nuclei had developed. Before any $TiO_2$ could coagulate to a filterable precipitate 200 cc. of a rutile-inducing seed suspension were added. This contained 75 g./l. of a special titanium oxide seed material prepared as follows:

One liter of titanium tetrachloride solution, containing 80 g./l. $TiO_2$, was added with stirring to one liter of water containing 128 g. of NaOH. The resulting mixture was heated to 85° C. for 30 minutes, after which it was cooled and neutralized to 7 pH by addition of dilute sodium hydroxide solution. The precipitate was washed free of chlorides and reslurried in water to give a suspension containing 75 g./l. $TiO_2$.

The hydrolyzing titanium solution turned white soon after the addition of the said rutile-inducing seeds, thus incorporating them within the raw pigment particles. The solution was boiled for four hours to complete the $TiO_2$ precipitation; a yield of 95½% was obtained. When conventionally washed, purified, treated with 1% of potassium sulfate and calcined at a temperature of 960° C., the resulting product consisted of rutile of high strength, excellent color, small uniform particle size, hiding power and undertone. In a parallel, comparative experiment wherein the initial strike was dispensed with and only the rutile-forming seed component added to a titanium solution of adjusted concentration, the color of the final pigment was satisfactory but its particle size was very large and its hiding power was lower by 18-20%.

Example II 4 liters of a titanium sulfate solution containing 250 g./l. of $TiO_2$, 80 g./l. of iron, 660 g./l. of $H_2SO_4$, and 3 g./l. of $Ti_3^{+++}$, were heated to 97° C. in a suitable vessel. Simultaneously, one liter of water was heated to 91° C. in a separate vessel with sufficient capacity to retain both liquids. The ilmenite solution was then added to the water at a rate of 250 cc. per minute. The temperature of the resulting mixture was raised at a rate of ⅓ of a degree per minute to the boiling point of the solution. Immediately thereafter 200 cc. of a rutile-inducing seed suspension were added to the hot solution to form my novel nucleating complex. This contained 75 g./l. of a special titanium oxide seed material prepared in the following way:

100 cc. of titanium sulfate solution containing 150 g./l. $TiO_2$, essentially free of iron and other color-imparting impurities, were diluted with an equal amount of water and the $TiO_2$ precipitated by adding a sufficient amount of dilute caustic solution to bring the pH to 7. The titanium hydrate precipitated in this fashion was filtered and washed free of soluble sulfates. The cake was reslurried into 500 cc. of water and acidified with HCl to .4 N. The temperature of the suspension was raised to 85° C. and the seed aged for a period of 30 minutes. The $TiO_2$ peptized to a colloidal sol. After this heat treatment the suspension was cooled and neutralized to 7 pH by the addition of dilute caustic solution. The coagulated $TiO_2$ seed was filtered and washed free of chloride ions. The seed was then repulped to a volume of 200 cc. with distilled water.

The titanium sulfate solution containing the resulting seed complex was boiled for four hours to precipitate the titanium values and the $TiO_2$ then filtered and washed. After suitable purification the raw pigment was calcined in the presence of 1% of a mixture of potassium and sodium sulfate at a temperature of 960° C. The raw anatase pigment converted to rutile of high strength, small average particle size, excellent color and undertone.

Example III 5 liters of a titanium sulfate solution containing 200 g. of $TiO_2$ per liter, 60 g. of iron per liter, and 550 g. of $H_2SO_4$ per liter were heated to a temperature of 85° C. At this time a seed suspension of yield-inducing nuclei was added, which nuclei was prepared as follows:

100 cc. of titanium sulfate solution containing 150 g./l. of $TiO_2$ was diluted with 200 cc. of water. To this solution was added sufficient alkali solution to bring the pH to a value of 2.7. The suspension contained 30 g./l. of $TiO_2$. The temperature was raised to 80° C. and maintained for 30 minutes after which the seed was cooled, filtered and repulped to 75 g./l.

The titanium liquor containing the yield-inducing nuclei was then heated at a rate of ⅓ of a degree per minute to the boiling point. Fifty minutes after said nuclei addition, 200 cc. of a rutile-inducing seed suspension were added, which suspension contained 75 g./l. $TiO_2$ and was prepared as follows:

A titanium chloride solution containing 80 g./l. $TiO_2$ was combined with an alkali solution, the amounts of reagents and concentrations being so chosen as to produce a final solution of pH 2 and a concentration corresponding to 30 grams $TiO_2$ per liter. This mixture was then heated to 80° C., held at this temperature for 30 minutes, and then cooled by the addition of cold water and neutralized to 7 pH, to precipitate the $TiO_2$ values thereof. The resulting cake was then reslurried to 75 g./l.

The resulting nucleated solution was then brought to the boiling point and boiled for four hours; a yield of 95% being obtained. The precipitate was washed, purified, treated with 1% of a mixture of potassium and sodium sulfate salts and calcined at 900° C. to develop its pigment properties. The calcined material consisted of rutile of high strength, excellent color, hiding power and undertone.

Example IV

Yield-inducing nuclei prepared as in Example III, but aged in an $H_2SO_4$ medium of .05 N. for 30 minutes at 85° C. and rutile-inducing nuclei as prepared in Example I were suitably combined and then thoroughly mixed. The proportions based on $TiO_2$ were 1 to 1, and the combined suspension contained 75 g./l. $TiO_2$. 400 of this complex seeding suspension were added to 5 liters of titanium sulfate solution containing 200 g./l. $TiO_2$, 60 g. of iron and 500 g. sulfuric acid. The nuclei dispersed completely in the titanium liquor so that no particles were visible but a distinct Tyndall cone could be observed when the solution was properly illuminated. The temperature of the liquor on introducing the seed was 80° C. and was raised, after seed addition, to the boiling point at a rate of ⅓ of a degree per minute. The solution was boiled for four hours to complete the precipitation. A yield of 97.3% was obtained. When washed, purified, treated with about 1% of the sodium and potassium sulfate salts and calcined at 950° C., the resulting product comprised rutile of high strength, excellent color, hiding power and undertone.

*Example V*

A yield-inducing seed material was prepared in the following manner:

50 cc. of a titanium sulfate solution containing 250 g./l. of TiO$_2$ were added to 3 liters of water at a temperature of 90° C. Upon addition of the titanium sulfate solution, a white finely-divided precipitate was obtained and this was allowed to age for a period of 10 minutes. The resulting suspension was cooled rapidly and the TiO$_2$ allowed to settle. 10 grams of seed material, as TiO$_2$, were obtained by this operation. The water was decanted and the precipitate dewatered by suitable gravity filtration. The recovered yield-inducing nuclei were then added to five liters of titanium sulfate solution containing 200 g. of TiO$_2$ per liter, 60 g. of iron per liter, and 500 g. sulfuric acid per liter, which had been heated to 90° C. The temperature was raised at a rate of ¼ of a degree per minute. Fifty minutes after the addition of the yield-inducing nuclei 200 cc. of a rutile-inducing seed suspension were added. This contained 75 g./l. of a special titanium oxide material which had been prepared in the same manner as the rutile seeding component of Example I, except that in this case the rutile seed was first subjected to vigorous milling in a colloid mill and acidified with dilute sulfuric acid to a pH of 2 before being added to the hot hydrolyzing solution.

The hydrolyzing titanium solution turned white soon after the addition of said rutile seeding component, thus incorporating the same within the raw pigment particles. The solution was boiled for four hours to complete the precipitation. When washed, purified, treated with alkali salts, as in Example V, and calcined at a temperature of 945° C., the resulting pigment comprised rutile displaying high strength, excellent color, hiding power and undertone.

*Example VI*

Ten grams of yield-inducing nuclei, prepared in accordance with Example V were combined with 15 grams of rutile-inducing seed prepared in accordance with Example II. The two hydrous titanium oxides were then thoroughly comminuted and mixed. The suspension containing 25 grams of TiO$_2$ was added to 5 liters of titanium sulfate solution maintained at 90° C. and containing, per liter, 200 g. TiO$_2$, 60 g. of iron and 550 g. sulfuric acid. Both components of this complex nucleating agent dispersed in the liquor to sub-microscopic dimensions. The seeded solution was then heated to the boiling point at a rate of ⅓ of a degree per minute and boiled for four hours. As a result, in excess of 95% of the titanium values were precipitated. The raw pigment was filtered, washed and subjected to further purification steps, treated with 1% by weight of a mixture of potassium and sodium sulfates, calcined at a temperature of 950° C. The calcined pigment TiO$_2$ comprised rutile of high strength, excellent color and undertone.

While described above as applied to certain preferred embodiments, the invention is not to be construed as limited thereto nor to the specifically mentioned temperatures, conditions, concentrations, solutions, ratios, reactants or quantities of nucleating agent complex or mixtures used. Thus, although outstandingly useful in titanium sulfate solution hydrolysis, my novel complex may be also used with advantageous results in the hydrolysis of other titanium sulfate solutions or other titanium liquors or salts, such as titanium nitrate, chloride, oxalate, bromide, acetate, etc., whether the solutions so hydrolyzed are relatively dilute or concentrated, and whether the hydrolysate or final pigment is to comprise anatase or rutile or mixtures of both.

Similarly, while calcination temperatures ranging from substantially 850° C.–975° C. are indicated as preferred, because optimum results and rutile conversions arise by reason of their use, and furthermore such temperatures comprise those ordinarily employed in anatase pigment manufacture, other calcination temperatures to as low as, say, about 750° C. may be also used. Normally, in attaining the beneficial results of my invention, temperatures not exceeding 1000° C. need be employed. Thus, it will be understood that it may be necessary to vary the temperature to promote the desired conversion of the anatase, and that the use of any particular temperature will largely depend upon the composition or inherent nature of the TiO$_2$ under treatment, the particular pigment properties to be developed and the crystallinity or amount of rutile which it is desired the finished product shall possess. In effecting conversions to rutile, I prefer to employ such calcination temperatures and times as will promote conversion of at least a major portion of the TiO$_2$ under treatment, and preferably convert at least 80% thereof to rutile. In obtaining optimum benefits hereunder, I prefer to employ such temperatures as will exert from substantially 90–100% conversions and in excess of about 95% conversion. As already indicated, ores from various sources may contain differing types and quantities of metallic or other impurities, some of which may act as inhibitors for the conversion while others may act as promoters therefor. Hence, unless special precautions are observed in preparing the raw pigment or care is taken to completely eliminate or reduce such impurities to a minimum, their presence in the hydrolysate may require the use of higher calcination temperatures. Thus, instances may exist in which temperatures in excess of substantially 1000° C. and up to, say, 1050° C. or higher, may be necessary to induce the desired conversion to rutile. Accordingly, I contemplate employing in the invention such higher order of calcination temperatures where necessary and where no serious impairment in pigment properties accrues by reason of their use.

A salient feature of the invention involves the provision and use of a novel nucleating complex or mixed form of seeding material for titanium salt solution hydrolysis, the essential components or constituents of which comprise at least two distinctive forms of TiO$_2$ nuclei having certain special and peculiar properties which are not possessed or present in the other or remaining components of the complex. Additionally, said agent has the highly desired property of performing and exerting a dual function in the hydrolysis, e. g., promotes both high yields of precipitated titanium oxide and produces a form of anatase hydrolysate which readily converts to rutile when calcined at relatively low temperatures commensurate with those normally employed in developing pigment properties in commercial anatase pigment manufacture. Primarily, it provides a means of obtaining a hydrolysis precipitate of relatively small particle size which will inherently produce high quality pigment rutile on calcination. At least one of the components of said complex comprises an adequate quantity of colloidal $TiO_2$ which either has been specially prepared and then incorporated in the titanium solution prior to hydrolysis, or is developed in the hydrolyzable solution prior to any actual $TiO_2$ precipitation. This component comprises normal, yield-inducing anatase $TiO_2$ nuclei which will remain substantially in the anatase modification, even after calcination at temperatures ranging from about 400° C. to about 600° C. The other or remaining component or components of the complex comprise $TiO_2$ nuclei adapted to accelerate rutile conversions and comprises either rutile at ordinary temperatures (depending upon the conditions which prevail during its manufacture) or readily converts to rutile when calcined at said 400° C.–600° C. temperatures. Each of the essential components of my novel complex contributes to the novel, unexpected results which I attain, e. g., my novel form of hydrolysate, the procurement of which is unattainable when the individual components of the complex are used alone. An additionally advantageous result following the use of my complex permits one to use only relatively small quantities of the seeding agent in the hydrolysis and affords production of a novel rutile pigment possessing such uniformity and smallness of particle size that it is outstandingly improved over prior rutile products. For example, the average particle size of a rutile pigment obtained in accordance with my invention will not exceed substantially 0.5 micron in diameter and usually will be within the range of from about 0.2 to below 0.4 micron. In this fine state of sub-division and particle size uniformity, the final pigment, in addition to possessing satisfactory color characteristics, will inherently possess superior hiding power and tinting strength values.

An additional advantage of the invention resides in the fact that my novel product can be produced in conjunction with processes normally used in commercial anatase pigment manufacture. Hence, the ready adaptability of my invention to present commercial $TiO_2$ pigment processes is obvious. Previously, one could only obtain rutile by resorting to prohibitive conversion temperatures far in excess of those used for producing a pigment of maximum hiding power. Such prior products, therefore, would be poorer in tinting strength and hiding power than the anatase product from which the rutile pigment would be normally derived. The value of the present invention is thus further emphasized because my novel hydrolysate calcines to rutile having a particle size which approaches the optimum for that crystalline modification and produces a pigment the strength and hiding power of which are substantially above (approximately 30%) of that of the best anatase.

The amount of nucleating complex which I employ and the proportion or ratio of the yield-inducing $TiO_2$ nuclei to the rutile-producing component thereof are also variable. The total amount of seed used in the hydrolysis normally need not exceed the quantity employed in conventional hydrolyses for anatase pigment manufacture. That is, the total amount of seeding agent need not exceed substantially 10%, on the basis of the $TiO_2$ to be hydrolyzed. The use of substantially higher amounts may be employed, if desired, although normally this is unnecessary. Usually, the total amount of nuclei complex used ranges from about .3% to 5%, similarly on the $TiO_2$ basis. The ratio or amount of rutile-inducing to the yield-inducing accelerator in the complex is also variable but, as stated, the rutile-inducing component is preferably in minor proportion to the yield-inducing constituent. Generally, the amount of rutile-forming constituent may range from about .1% to 5%, and preferably comprises from about .5% to about 2.0% of the total seed used, said percentage amounts being based on the $TiO_2$ to be hydrolyzed.

The yield-inducing component of the complex preferably comprises the colloidal $TiO_2$ nuclei contemplated in said U. S. Reissue Patent 18,854. Other well-known forms of colloidal $TiO_2$ yield-inducing nuclei may be employed, as may be other methods of preparing the same, examples of such other types of nuclei and methods for preparing them including U. S. Reissue Patent 18,790. The yield-promoting agent may be externally prepared as in said Reissue Patent 18,790 or it may be created within the titanium salt solution in a manner similar to that disclosed in said Reissue Patent 18,854. In the latter event, however, the seed is not normally isolated as such, but nevertheless is present during the hydrolysis.

The rutile-promoting components of the complex preferably comprise those specified above but, if desired, may consist of other types and may be either used alone or in conjunction with those already mentioned. It has been found more expedient in the preferred practice of the invention that an essential component of the complex be externally prepared and then incorporated in the titanium solution to be hydrolyzed and which contains the other or remaining components of the complex. The externally-prepared agent preferably comprises the rutile-inducing component of the complex. Said agent preferably comprises relatively pure precipitated orthotitanic acid which has been heat-treated or aged for a short period of time in a monobasic mineral acid which is peptizing in character (hydrochloric, nitric, perchloric, perbromic acids, etc.), the aging conditions, however, being selected within rather wide limits and as contemplated in the aforesaid John L. Keats et al. application Ser. No. 283,052, filed July 6, 1939. As therein disclosed, the acidity of the solution in which the agent is suspended may vary from about .1 N. and 1.0 N. or even higher. Polybasic acids and ions of such acids should not be present in any appreciable amounts in the monobasic acid medium and the temperature at which the aging or conditioning takes place may vary from about 60° C.–100° C., the length of time over which the aging treatment is effected being dependent upon the temperature and acid concentrations used. Lower temperatures require longer aging times and vice versa but in any event the temperature and concentrations are so selected that the time will not exceed about 1 hour or be less than about 10 minutes. Also outstandingly useful and preferred for use in the invention as the rutile-inducing nuclei component of my novel complex are the nuclei which when subjected to X-ray analysis following heat treatment at temperatures ranging from above 100° C. and up to, say, about 550° C., exhibit a rutile diffraction pattern ranging from about 10 to 95 or 100%. These are readily prepared by treating hydrous titanium oxide under controlled conditions with respect to both basicity and acidity, such as by combining a relatively pure solution of titanium chloride with an alkaline material in such manner that the resulting hydrous titanium oxide will be subjected to successive maintenance or ripening under both alkaline and acidic conditions and under specific alkaline and acidic normalities, as more particularly disclosed and contemplated in my co-pending application with James Eliot Booge, Ser. No. 426,248, filed January 9, 1942. Examples of other usefully employable rutile-inducing TiO₂ nuclei include the raw rutile pigment or hydrolysate obtained on hydrolyzing a titanium chloride solution in accordance with U. S. Patent 2,062,133; and the seeding agent resulting when a colloidal suspension of hydrated titanium oxide is coagulated and then dewatered to avoid dilution of the solution undergoing hydrolysis, as more particularly disclosed in my copending application Ser. No. 426,247, filed January 9, 1942.

While I prefer to incorporate the rutile-inducing component of the complex into a titanium solution which already contains the colloidal, yield-inducing constituent of said complex, if desired, said complex may be externally mixed or composited together and then introduced into the hydrolyzable liquor. Any order of mixing the components with each other or with the solution to be hydrolyzed may be resorted to. If preferred, one may add an externally prepared seeding component to the hydrolyzable solution after suitable aging in a colloidal medium, following which the partially nucleated solution may be added to water maintained at an elevated temperature, thereby providing an additional advantageous seeding action. Regardless of the manner in which the complex is produced or the order in which the components of the complex are mixed together, it is essential and critical to the invention that hydrolysis of the solution take place in the presence of the complex and that the seeding agent used, especially in instances of titanium sulfate solution hydrolysis, shall be capable of performing at least the dual function of providing both high TiO₂ yields and a form of anatase precipitate which will convert to rutile when calcined at temperatures comparable to those normally used in anatase pigment development. It is also essential that at least one or part of the components making up my novel complex shall exhibit the diffraction pattern of rutile on X-ray analysis, after being heated to a temperature not in excess of 600° C., while the other or remaining components of the complex, the chief function of which is to promote high TiO₂ yields, shall be in substantially the anatase modification when subjected to the same conditions of heat treatment.

Obviously, seeding suspensions, when externally prepared, may greatly vary in concentration. Great dilutions are to be avoided and it is usually well to dewater prior to the addition of the hydrolyzable titanium solution. In this way, one may use less concentrated solutions than otherwise and this practice is recommended because of its economic advantages. Excessive dilutions are to be avoided and the seeding agent is preferably maintained in wet condition from the time it is prepared until it is incorporated within the hydrolyzable solution. The dry form of seeding material is not recommended for use, due to the difficulty which is encountered in dispersing such form of material within titanium salt solutions.

While the invention has been described in its preferred application to the production of straight or unextended forms of titanium oxide pigments, it will be understood that the production of mixed or extended forms of such pigments is contemplated. Thus, I contemplate producing in accordance with the invention TiO₂ pigments containing prime pigments, such as zinc sulfide, lithopone, zinc oxide, metallic titanates, etc., such inorganic extenders as barium sulfate, calcium sulfate, calcium carbonate, magnesium silicates, etc., or mixtures thereof, which either have been precipitated upon, co-precipitated with, or blended with the titanium oxide during its manufacture, processing or finishing.

The term "nucleating complex" or complex seeding agent, as used here or in the appended claims, applies to the seeding agent compositions or mixtures herein referred to and whether said seeding material is separately prepared and then mixed together externally of the hydrolysis solution or has been separately prepared or concurrently introduced into said solution or formed in situ thereof. It also includes mixtures of any plurality of the yield and rutile-inducing components of my nucleating complex, whether such components have been mixed or blended together prior to use in the hydrolysis or added to the hydrolyzable solution during or throughout the various stages of the hydrolysis.

I claim as my invention:

1. A process for producing a titanium oxide pigment which comprises hydrolyzing a titanium salt solution in the presence of a nucleating complex comprising both anatase yield and rutile-inducing TiO₂ nuclei which have been separately prepared, the yield-inducing nuclei on X-ray analysis and after subjecting to calcination treatment at temperatures up to about 600° C. comprising anatase, while the rutile-inducing nuclei comprise rutile when subjected to substantially the same conditions of calcination treatment, recovering the raw pigment precipitate which results from said hydrolysis and subjecting the same to calcination treatment to develop its pigment properties.

2. A process for producing a titanium oxide pigment comprising rutile which comprises hydrolyzing a titanium salt solution in the presence of a relatively small amount of a nucleating complex comprising both anatose yield and rutile-inducing TiO₂ nuclei which have been separately prepared, the yield-inducing components of said complex, on X-ray analysis and after subjection to calcination treatment at temperatures ranging from substantially 400° C.–600° C. comprising anatase, while the rutile-inducing component of said complex comprises complex comprising both anatase yield and conditions of calcination treatment, recovering the hydrolysate obtained from said hydrolysis and then calcining the same to develop its pigment properties.

3. A process for producing rutile titanium oxide from a titanium sulfate solution which comprises hydrolyzing said titanium sulfate solution in the presence of a relatively small amount of a nucleating complex comprising both anatase yield and rutile-inducing TiO₂ nuclei which have been separately prepared, the yield-inducing components of said complex exhibiting substantially the X-ray diffraction pattern of anatase after subjection to calcination treatment at temperatures ranging from 400° C.–600° C., while the rutile-inducing components of said complex exhibit substantially the X-ray diffraction pattern of rutile when subjected to substantially the same conditions of calcination treatment, recovering and purifying the anatase precipitate from said hydrolysis and calcining the same at a temperature not to exceed substantially 1000° C.

4. A process for obtaining a rutile titanium oxide pigment from a hydrolyzable titanium sulfate solution which comprises hydrolyzing said solution in the presence of a relatively small amount of a nucleating complex comprising both anatase yield and rutile-inducing $TiO_2$ nuclei which have been separately prepared, said rutile-inducing components being in minor proportion to the yield-inducing type, and on X-ray analysis after calcination treatment at temperatures ranging from substantially 400° C.–600° C., comprising rutile, while the yield-inducing nuclei components of said complex exhibit, on X-ray analysis, the diffraction pattern of anatase after subjection to substantially the same conditions of calcination treatment, recovering and washing the anatase precipitate obtained from said hydrolysis, and then calcining the purified precipitate at temperatures ranging from substantially 850° C.–975° C.

5. A process for producing rutile titanium oxide pigment which comprises hydrolyzing a titanium sulfate solution in the presence of a relatively small amount of a nucleating complex made up of separately-prepared components, characterized in that the major proportion of the $TiO_2$ present therein exhibits substantially the diffraction pattern of anatase on X-ray analysis and after calcination at temperatures ranging from substantially 400° C.–600° C., while the minor proportion thereof exhibits substantially the diffraction pattern of rutile when calcined at substantially the same temperatures, recovering the resulting anatase hydrolysate, and calcining the purified product at a temperature ranging from substantially 750° C. to 1000° C.

6. A process for hydrolyzing a titanium salt solution which comprises conducting the hydrolysis of said solution in the presence of a small amount of a nucleating complex made up of separately-prepared components, characterized by the fact that a major portion of the $TiO_2$ present therein exhibits, on X-ray analysis, substantially the diffraction pattern of anatase after calcination treatment at temperatures not exceeding substantially 600° C., while the remaining portion thereof exhibits substantially the diffraction pattern of rutile when subjected to the same conditions of calcination treatment.

7. A process for hydrolyzing a titanium sulfate solution to recover an anatase hydrolysate which converts substantially to rutile when calcined at temperatures ranging from substantially 750° C.–1000° C., comprising effecting the hydrolysis of said solution in the presence of a small amount of a $TiO_2$ nucleating complex made up of separately-prepared components, characterized in that the major portion of its $TiO_2$ components exhibit, on X-ray analysis, substantially the diffraction pattern of anatase when calcined at temperatures ranging from substantially 400° C.–600° C., while the minor portion thereof exhibits substantially the diffraction pattern of rutile when subjected to the same conditions of calcination treatment.

8. A process for producing an improved rutile titanium oxide pigment by converting precipitated anatase by calcination treatment at temperatures not in excess of substantially 1000° C., which comprises hydrolyzing a titanium sulfate solution in the presence of a small amount of a nucleating complex made up of separately-prepared components consisting of a mixture of colloidal titanium oxide which exhibits both the anatase and rutile crystalline patterns when calcined at temperatures ranging from substantially 400° C.–600° C., recovering and washing the anatase precipitate resulting from said hydrolysis and then calcining the purified product at a temperature ranging from substantially 750° C.–1000° C.

9. A process for producing an improved rutile titanium oxide pigment by converting precipitated anatase through calcination at temperatures not in excess of substantially 1000° C., which comprises hydrolyzing a relatively concentrated titanium sulfate solution in the presence of a small amount of a nucleating complex, comprising a mixture of titanium oxide which, on X-ray analysis, exhibits substantially the diffraction pattern of anatase when calcined at temperatures ranging from substantially 400° C.–600° C., and separately-prepared, peptized titanium oxide obtained by heat treating the titanium oxide in the presence of a monobasic acid and which exhibits substantially the diffraction pattern of rutile when calcined at substantially the same temperatures, recovering and washing the precipitate which results from said hydrolysis, and calcining the purified product at temperatures ranging from about 750° C.–1000° C.

10. A process for hydrolyzing a titanium sulfate solution to obtain therefrom an anatase hydrolysate adapted to convert to rutile when calcined at temperatures ranging from substantially 850° C.–975° C., which comprises hydrolyzing said solution in the presence of from about .3% to 10%, on the basis of the $TiO_2$ to be hydrolyzed, of the $TiO_2$ nucleating complex made up of separately-prepared components, the major proportion of the $TiO_2$ of said complex exhibiting, on X-ray analysis, after being subjected to calcination at temperatures ranging from substantially 400° C.–600° C. the anatase diffraction pattern, while the minor proportion thereof exhibits substantially the rutile diffraction pattern upon subjection to the same calcination treatment, recovering the anatase precipitate derived from said hydrolysis and calcining the purified product at temperatures ranging from 850° C.–975° C.

11. A process for hydrolyzing a titanium sulfate solution to obtain therefrom an anatase type of hydrolysate adapted to convert to rutile when subjected to pigment development calcination temperatures below about 1000° C., which comprises hydrolyzing said solution in the presence of from about .3% to 10%, on the basis of the $TiO_2$ to be hydrolyzed, of a $TiO_2$ nucleating complex made up of both anatase yield and rutile-inducing $TiO_2$ nuclei which have been separately prepared, the rutile-forming constituents thereof ranging in amount from about .1% to 5% of the total seeding material, based on the $TiO_2$ to be hydrolyzed, and said yield-inducing nuclei exhibiting the diffraction pattern of anatase when calcined at temperatures ranging from substantially 400° C.–600° C., while the rutile-inducing nuclei exhibit the rutile diffraction pattern when calcined under the same conditions of temperature, recovering and washing the anatase precipitate resulting from said hydrolysis, and then calcining the recovered hydrolysate to develop its pigment properties.

12. A process for hydrolyzing a titanium sulfate solution to obtain an anatase $TiO_2$ precipitate therefrom adapted to convert to rutile when subjected to calcination treatment at temperatures ranging from substantially 850° C.–975° C., which comprises nucleating said solution by initially incorporating therein anatase yield-inducing type of nuclei comprising $TiO_2$ nuclei, which, when calcined at temperatures ranging from substantially 400° C.–600° C., exhibits, on X-ray analysis, the diffraction pattern of anatase, subsequently and before formation of a filterable precipitate in said solution incorporating a rutile-inducing type of nuclei which, after subjection to said 400° C.–600° C. calcination temperatures, exhibits, on X-ray analysis, substantially the diffraction pattern of rutile, thereupon hydrolyzing the resulting mixture at an elevated temperature, recovering and purifying the anatase precipitate resulting from said hydrolysis, and then calcining the same to develop its pigment properties.

13. A nucleating seeding complex for hydrolyzable titanium salt solutions comprising separately prepared anatase yield-inducing nuclei, which, after subjection to calcination treatment at temperatures up to about 600° C., exhibits, on X-ray analysis, the diffraction pattern of anatase, and separately-prepared rutile-inducing nuclei which, when subjected to substantially the same conditions of calcination treatment, exhibits substantially the diffraction pattern of rutile.

14. A nucleating seeding complex for titanium sulfate solution hydrolysis comprising separately-prepared anatase yield-inducing $TiO_2$ nuclei which, when subjected to calcination treatment at temperatures ranging from about 400° C.–600° C., exhibits, on X-ray analysis, the diffraction pattern of anatase, and separately-prepared rutile-inducing $TiO_2$ nuclei which, when subjected to substantially the same conditions of calcination treatment, exhibits, on X-ray analysis, the diffraction pattern of rutile.

15. A nucleating seeding complex for titanium sulfate solution hydrolysis, comprising separately-prepared anatase yield-inducing $TiO_2$ nuclei, which, when subjected to calcination treatment at temperatures ranging from about 400° C.–600° C., exhibits, on X-ray analysis, the diffraction pattern of anatase, and separately-prepared rutile-inducing $TiO_2$ nuclei, which, when subjected to calcination treatment under the same conditions of temperature, exhibit, on X-ray analysis, the diffraction pattern of rutile, said rutile-inducing component in said complex being in minor proportion to the anatase component thereof.

16. A process for hydrolyzing a titanium sulfate solution to obtain an improved type of anatase hydrolysate adapted to convert to rutile when calcined at pigment-developing temperatures below substantially 1000° C., which comprises adding the titanium sulfate solution to be hydrolyzed to a lesser volume of hot water to initially form in the resulting mixture a small amount of anatase yield-inducing type of $TiO_2$ nuclei which, after calcination treatment at temperatures ranging from 400° C.–600° C., exhibits the diffraction pattern of anatase on X-ray analysis, subsequently, but prior to formation in said mixture of a filterable $TiO_2$ precipitate, adding a small amount of a separately-prepared rutile-inducing seed suspension therein, which latter nuclei comprises rutile when calcined at said 400° C.–600° C. temperature, thence hydrolyzing said titanium sulfate solution in the presence of the resulting nucleating complex and recovering for pigment development through calcination the raw pigment anatase precipitate resulting from said hydrolysis.

CARL MARCUS OLSON.

CERTIFICATE OF CORRECTION.

Patent No. 2,342,483.  February 22, 1944.

CARL MARCUS OLSON.

It is hereby certified that error appears in the printed specification of the above numbered patent requiring correction as follows: Page 3, second column, line 65, Example IV, for "400" read --400 cc.--; page 6, second column, line 62, claim 2, for "complex comprising both anatase yield and" read --rutile when subjected to substantially the same--; and that the said Letters Patent should be read with this correction therein that the same may conform to the record of the case in the Patent Office.

Signed and sealed this 9th day of May, A. D. 1944.

Leslie Frazer (Seal)   Acting Commissioner of Patents.